L. PAIGE.
Grinding Mill.
No. 14,164.
2 Sheets—Sheet 1.
Patented Jan. 29, 1856.
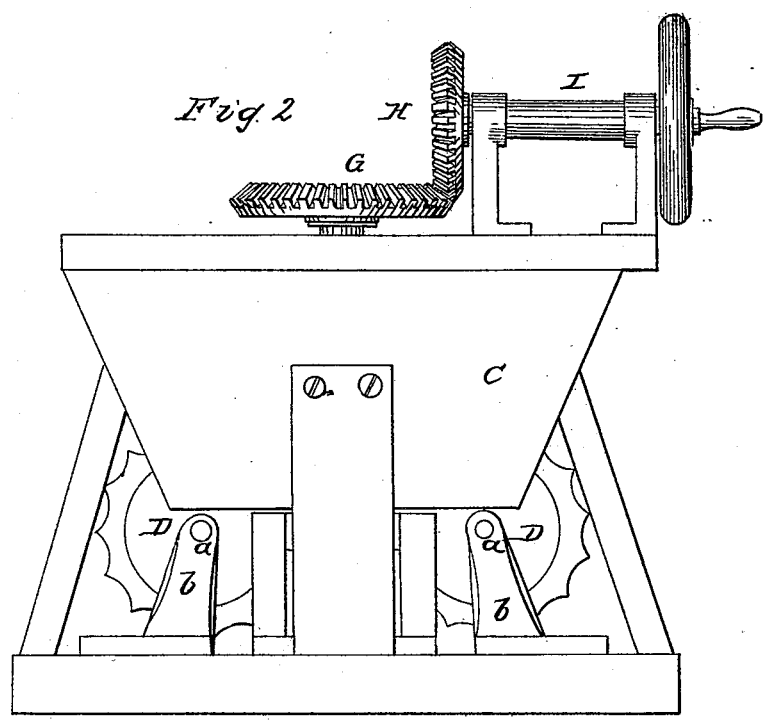
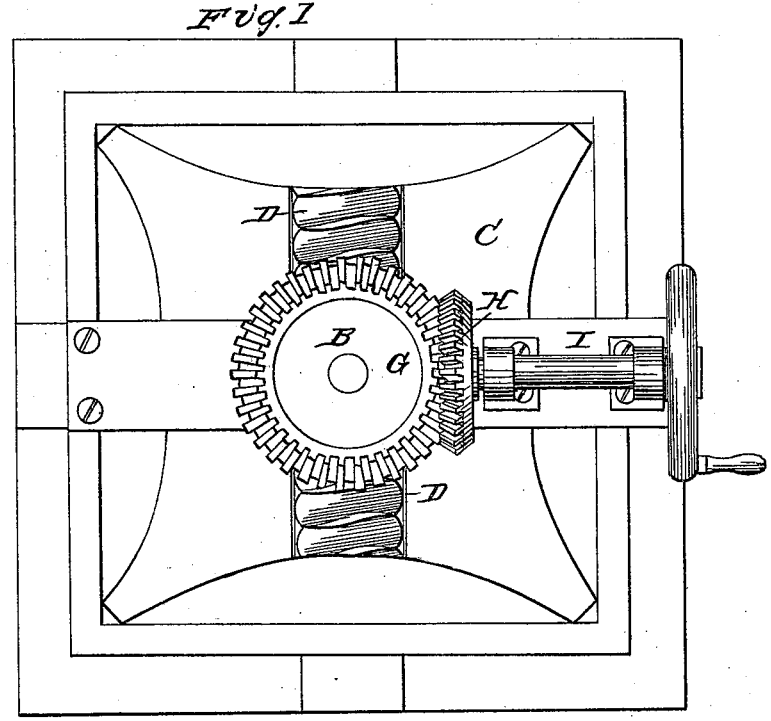

L. PAIGE.
Grinding Mill.
No. 14,164.
2 Sheets—Sheet 2.
Patented Jan. 29, 1856.
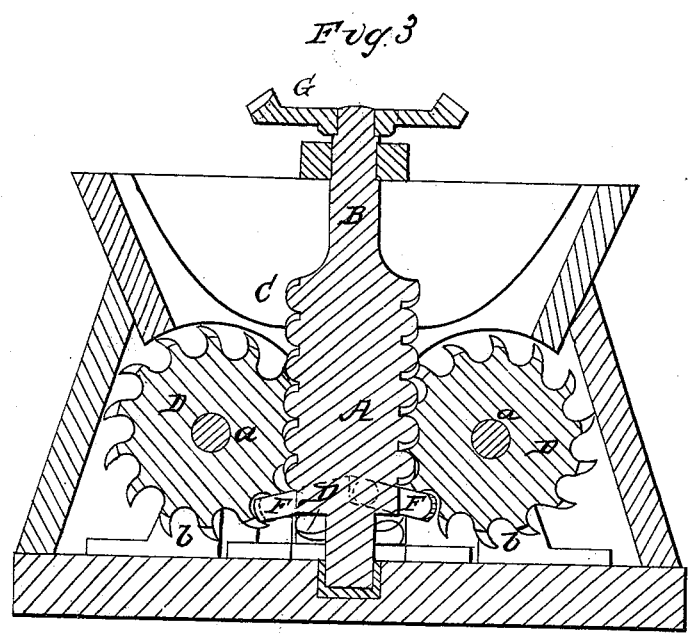
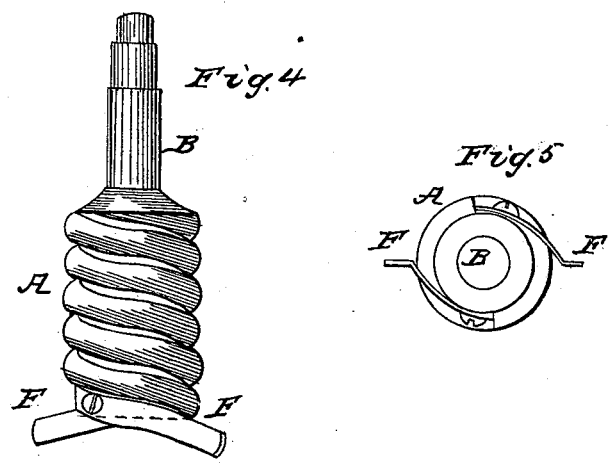
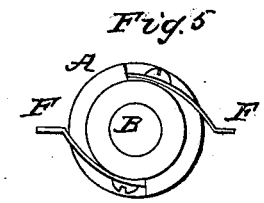

UNITED STATES PATENT OFFICE.

LUCIUS PAIGE, OF CAVENDISH, VERMONT.

GRINDING-MILL.

Specification of Letters Patent No. 14,164, dated January 29, 1856.

*To all whom it may concern:*

Be it known that I, LUCIUS PAIGE, of Cavendish, in the county of Windsor and State of Vermont, have invented a new or Improved Mill for Grinding; and I do hereby declare that the same is fully described and represented in the following specification and the accompanying drawings, of which—

Figure 1 exhibits a top view of it; Fig. 2, a front elevation thereof; Fig. 3, a vertical and central section of it. Fig. 4, is a side elevation of the screw, while Fig. 5, is a bottom view of said screw as it appears when separated from the machine.

In carrying out my invention I make use of a screw, A, applied to a vertical shaft B, extending downward, through a hopper, C, and supported in suitable bearings, so as to be capable of being rotated. In connection with the said screw and hopper, I employ four or any other suitable number of wheels D, D, D, D, whose peripheries are formed with teeth or helical spaces to so engage and work with the screw, that when said screw is revolved, each of said wheels will be put in revolution thereby on its own axis.

In the drawings I have exhibited four of said wheels arranged about the screw and having their axles, *a*, *a*, supported by standards, *b*, *b*. These wheels project into the hopper, C, which is formed so as to extend between them and to cause any material put into it, to flow or fall into the angular space between the wheels and the screw. There is fixed upon the lower part of the screw or its shaft one, or more spring screw pins F, F, such being arranged so as to enter and pass through the grinding cavities of the wheels and scrape them out or clear them during the revolution of the screw and immediately after they may have performed their functions. Any suitable power may be applied to said screw in order to put it in revolution.

In the drawings, I have exhibited a bevel gear G, as fixed to the top of the shaft of the screw and made to engage with another such gear, H, attached to a driving shaft, I.

When sugar or any article to be ground is placed in the hopper and the screw is put in revolution, the wheels will be set in rotation toward the screw and will move the material toward it, and first crush it between them and the screw and finally by the action of the screw the material will be ground and discharged out of the hopper. For the purpose of adjusting the wheels nearer to or farther from one another or the screw, they may have suitable adjusting contrivances applied to them or their supports.

A mill constructed and made to operate in the above described manner has been found very advantageous for crushing and grinding or pulverizing various substances.

I claim—

Arranging and combining with a screw in manner substantially as described, one or more wheels and a hopper whereby such mechanism is made to answer the purpose of a mill for grinding.

In testimony whereof, I have hereunto set my signature this twentieth day of November A. D. 1855.

LUCIUS PAIGE.

Witnesses:
J. P. DERBY,
WM. J. PILLSBURY.